Figure 1:
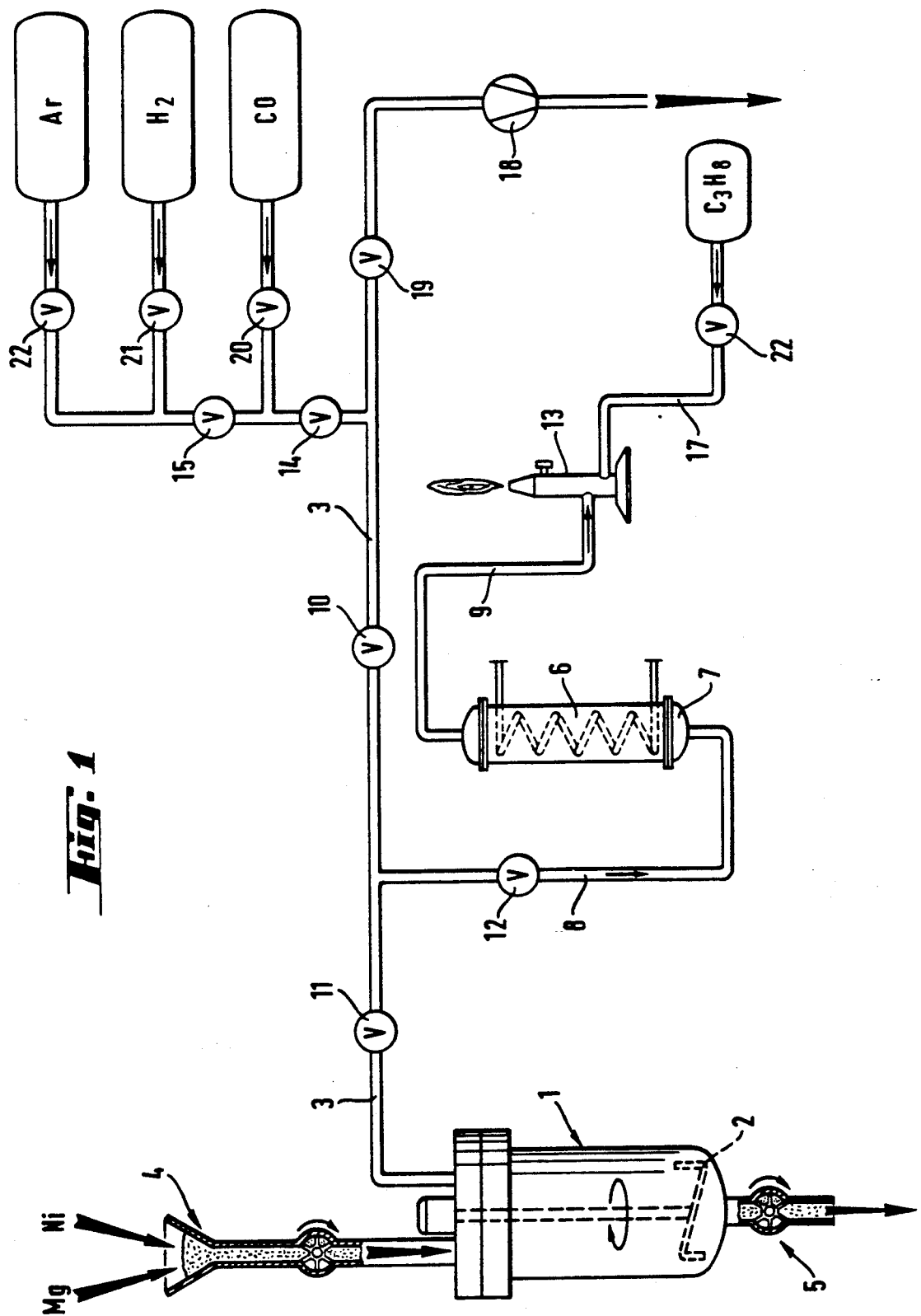

United States Patent [19]

Knott et al.

[11] Patent Number: 5,093,101

[45] Date of Patent: Mar. 3, 1992

[54] METHOD FOR THE PREPARATION OF ACTIVE MAGNESIUM HYDRIDE-MAGNESIUM-HYDROGEN STORAGE SYSTEMS AND APPARATUS FOR CARRYING OUT THE METHOD

[75] Inventors: Wilfried Knott, Essen; Klaus-Dieter Klein, Siegen; Götz Koerner, Essen, all of Fed. Rep. of Germany

[73] Assignee: Th. Goldschmidt AG, Essen, Fed. Rep. of Germany

[21] Appl. No.: 738,892

[22] Filed: Aug. 1, 1991

[30] Foreign Application Priority Data

Sep. 4, 1990 [DE] Fed. Rep. of Germany ....... 4027976

[51] Int. Cl.$^5$ ................................................ C01B 6/04
[52] U.S. Cl. ..................................... 423/647; 422/110; 422/189; 422/225
[58] Field of Search ................ 422/189, 110, 225; 423/647

[56] References Cited

U.S. PATENT DOCUMENTS

| | | | |
|---|---|---|---|
| 2,401,323 | 6/1946 | Alexander | 423/647 |
| 2,401,326 | 6/1046 | Archibald et al. | 423/647 |
| 3,743,711 | 7/1973 | Rogler et al. | 423/647 |
| 4,559,202 | 12/1985 | Luetzelschwab | 422/189 |
| 5,026,527 | 6/1991 | Krijgsman | 422/110 |

FOREIGN PATENT DOCUMENTS 0112548 7/1984 European Pat. Off. .

OTHER PUBLICATIONS

Journal of the Less-Common Metals, 158 (1990) pp. L1-L7, by P. Selvam and B. Viswanathan and V. Srinivasan.

*Primary Examiner*—Wayne Langel
*Attorney, Agent, or Firm*—Toren, McGeady & Associates

[57] ABSTRACT

A method for the preparation of active magnesium hydride-magnesium-hydrogen storage systems, which absorb hydrogen reversibly is disclosed. Finely divided magnesium is doped with nickel for this purpose. A pressure reactor is charged with a mixture of finely divided magnesium and an amount of nickel sufficient for the doping. Tetracarbonyl nickel is produced in the pressure reactor and subsequently decomposed. Carbon monoxide is then withdrawn from the pressure reactor and the doped magnesium obtained is hydrogenated at temperature of $\geq 300°$ C. and elevated pressure.

7 Claims, 1 Drawing Sheet

METHOD FOR THE PREPARATION OF ACTIVE MAGNESIUM HYDRIDE-MAGNESIUM-HYDROGEN STORAGE SYSTEMS AND APPARATUS FOR CARRYING OUT THE METHOD

FIELD OF INVENTION

The invention relates to a method for the preparation of active magnesium hydride-magnesium-hydrogen storage systems, which absorb hydrogen reversibly, by doping finely divided magnesium with nickel, which latter is deposited by the decomposition of tetracarbonyl nickel on the surface of the magnesium. The invention is also concerned with an apparatus for carrying out the method.

BACKGROUND INFORMATION AND PRIOR ART

European patent 0 112 548 discloses a method for the preparation of active magnesium hydride-magnesium-hydrogen storage systems which absorb hydrogen reversibly. In this method magnesium hydride or metallic magnesium is reacted in finely divided form by contact with a solution of a metal complex and/or an organometallic compound of a metal of the 4th to the 8th subsidiary group of the periodic system, optionally in the presence of hydrogen. The respective transition metal is deposited at the surface of the magnesium hydride and/or the magnesium particles.

As doping agent (precipitant), especially nickel complexes and/or organonickel compounds are used, the bis(cyclooctadiene)-nickel-(O) complex, $Ni(COD)_2$, being particularly preferred. This complex is suspended in toluene or tetrahydrofuran together with the finely divided magnesium. Either the complex is decomposed thermally or the complexly bound cyclooctadiene is hydrogenated to cyclooctane, the nickel being precipitated in each case. The precipitated nickel is deposited on the surface of the magnesium.

However, the doping reagent, $Ni(COD)_2$, is expensive, toxic and difficult to handle. Catalysts, for example, induce a progressive decomposition.

OBJECT OF THE INVENTION

It is the primary object of the invention to provide a simple, reliable and, moreover, economic nickel doping of the magnesium, which is intended for hydrogen storage systems. For this purpose, particular emphasis is placed on a safe procedure, which does not endanger the operating personnel nor contaminate the environment. Furthermore, a magnesium hydride powder is to be obtained, which is free flowing and therefore readily handled.

Another object is to provide a simple and efficient apparatus for carrying out the method.

SUMMARY OF THE INVENTION

The inventive method comprises the following steps:
a) a pressure reactor is charged with a mixture of magnesium of fine particle size and an amount of nickel sufficient for the doping, whereupon
b) carbon monoxide is admitted into the pressure reactor in an amount at least sufficient for converting the nickel quantitatively into tetracarbonyl nickel, this mixture is heated with intensive stirring to a temperature of about between 70° to 90° C. and left at this temperature for 15 to 60 minutes,
c) the pressure reactor is subsequently heated to a temperature of $\geq 180°$ C. until the tetracarbonyl nickel is decomposed completely,
d) the carbon monoxide is then drawn off from the pressure reactor and
e) the doped magnesium thus obtained is subsequently hydrogenated in a known manner at temperatures of $\geq 300°$ C. and an elevated pressure.

In step a), the pressure reactor is first charged with the mixture of finely divided magnesium and finely divided nickel. The particle size of the magnesium should range preferably from 20 to 100 μm and correspond particularly to the fraction that passes through a 270 mesh screen. The particle size of the nickel is less critical; however, a small particle size is of advantage for the reaction with carbon monoxide.

The amount of nickel added to the magnesium powder should correspond to that amount which is to be deposited during the doping on the surface of the magnesium powder. An amount of about 1.5 to 2.5% by weight of nickel, based on the magnesium, is aspired to by the doping. The reactor is accordingly charged with a mixture of 97.5 to 98.5% by weight of magnesium, the remainder being nickel.

The mixture is stirred intensively in the reactor. Carbon monoxide (CO) is admitted to the pressure reactor. The amount of carbon monoxide used should correspond at least to the amount of nickel, which is to be transferred to tetracarbonyl nickel according to the equation $$Ni + 4\ CO \rightarrow Ni(CO)_4$$

The molar ratio of CO:Ni accordingly is at least 4:1.

It is advantageous to adjust in the pressure reactor a certain pressure above atmospheric of about 0.3 to 0.6 MPa.

The reactor is now heated, until the interior has reached a temperature of about between 70° to 90° C. At this temperature, the tetracarbonyl nickel is formed within a short time (15 to 60 minutes).

The nickel is then deposited on the surface of the magnesium in a simple manner by decomposing the tetracarbonyl nickel by increasing the temperature in the reactor to $\geq 180°$ C. In so doing, the carbon monoxide, which is linked to the tetracarbonyl nickel, is released again and can, if necessary after replacement of any carbon monoxide lost, be supplied to a second pressure reactor, which is filled with the magnesium-nickel mixture, steps a) to d) of the method being carried out once again.

In view of its low cost, the carbon monoxide may, however, be oxidized and converted into carbon dioxide after step d). Advantageously, the carbon monoxide is mixed with a low boiling, gaseous hydrocarbon, such as propane or butane, and the gas mixture is then flared.

In order to remove even traces of tetracarbonyl nickel from the waste carbon monoxide gas, it is advisable, after step d) of the method, to pass the waste gas, which consists essentially of carbon monoxide, through a second reactor, which is charged with finely divided magnesium and heated to a temperature of $\geq 300°$ C. During the passage through a second such decomposition reactor, any traces of tetracarbonyl nickel, still contained in the waste gas, are decomposed reliably."

The waste gas, purified in this manner, can be combusted as described above.

The nickel-doped magnesium powder remaining in the pressure reactor is now hydrogenated in a known manner by treating it at $\geq 320°$ C. and a pressure of 0.5 to 5 MPa with hydrogen. After the hydrogen is absorbed and the magnesium hydride formed, the reactor is allowed to cool down and the reaction product is ultimately removed.

It is particularly surprising that the carbon monoxide used in the reaction does not interfere with or prevent the hydrogenation of the doped magnesium. This is so because it is known from the Journal of Less Common Metals, 158 (1990) L1 to L7, that carbon monoxide must be regarded as a catalyst poison for the hydrogenation reaction.

DESCRIPTION OF THE DRAWING AND PREFERRED EMBODIMENT

The single FIGURE of the drawing is a preferred embodiment of an apparatus for carrying out the inventive method.

Referring to the single FIGURE of the drawing, apparatus for carrying out the inventive method comprises a heatable pressure reactor 1. The reactor has an interior stirrer 2, a supply line 3 being arranged on top of the reactor for the supply of carbon monoxide, hydrogen and inert gas. A filler neck or funnel 4 sits on top of the reactor 1 while a sump outlet 5 is arranged at the bottom of the reactor for withdrawing material. The apparatus, moreover, includes a heatable decomposition reactor 6 which, in operation, is filled with magnesium of fine particle size. The reactor 6 has a supply line 8 which opens into the reactor 6 at the bottom thereof and communicates with the line 3 to supply to the reactor the contaminated carbon monoxide which is discharged from the pressure reactor 1. The reactor 6, at the top thereof, is fitted with an exit line 9 for discharging the purified carbon monoxide which is discharged from the deposition reactor. It will be noted that the decomposition rector 6, through the supply line 8 which opens up in the sump region 7 of the decomposition reactor 6, opens up in the supply line 3 and thus is connected with the pressure reactor 1. Valves 10, 11 and 12 are arranged in strategic locations, to wit: valve 11 is arranged in the line 3 between the pressure reactor 1 and ahead of the point where line 8 branches off from line 3 while valve 10 is arranged behind the point where line 8 branches off from line 3. Valve 12 is arranged in the line 8. As shown in the drawing, it is advantageous if discharge line 9 feeds burner 13 which is charged with burning gas.

The inventive method is carried out in the described apparatus as follows:

Magnesium of fine particle size and also nickel of fine particle size are filled into the pressure reactor through the fill neck or funnel 4 as indicated in the drawing. The two metal powders are thoroughly mixed with each other by means of the stirrer 2. With valves 12 and 14 closed and valves 11, 10 and 19 open, the reactor 1 is evacuated by means of pump 18 and the contents of reactor 1 are mixed intensively by means of the stirrer 2 and heated with stirring. When the interior of the reactor reaches a temperature of 70° to 90° C., valve 19 is closed and valves 14 and 20 are opened. Carbon monoxide now flows into reactor 1. After the required amount of carbon monoxide, as measured by the increase in pressure, has been introduced, valves 20, 14, 10 and 11 are closed. Tetracarbonyl nickel is now formed within 15 to 60 minutes, the reaction proceeding quantitatively. By heating the reactor further to a temperature of $\geq 180°$ C., the tetracarbonyl, formed in reactor 1, is decomposed. The nickel that is released is deposited uniformly on the surface of the stirred magnesium powder. After the decomposition has been completed, valves 11 and 12 are opened. The waste gas, which consists of carbon monoxide and, possibly, small amounts of tetracarbonyl nickel, flows through the decomposition reactor 6, which has been heated to $\geq 300°$ C. The waste gas leaving the decomposition reactor 6 has been purified and freed from traces of tetracarbonyl nickel. It is mixed with a mixture of heating gas and air supplied through valve 22 and pipeline 17 to a burner 13, and burned.

After valve 12 is closed and valves 21, 15, 14, 10 and 11 are opened, hydrogen is admitted to the reactor 1, in which the hydrogenation of the doped magnesium now takes place at a temperature of 300° C. and a hydrogen pressure of 0.5 to 5 MPa. After the hydrogenation, valve 21 is closed and valve 22 is opened, and reactor 1 is flushed with argon and allowed to cool down. After reactor 1 has cooled down, the doped magnesium hydride can be removed from reactor 1 by way of the sump outlet 5 as a free-flowing powder.

The inventive method is described in greater detail in the following example by reference to the drawing, it being understood that the example is given by of illustration and not by way of limitation.

EXAMPLE

Magnesium powder (500 g, 20.58 moles) with an average particle size of 54 μm (270 mesh), together with 10 g (0.17 moles) of nickel powder with an average particle size of 2.8 μm are added through filler neck 4 into the 5 L stirred autoclave or pressure reactor 1. The reactor 1 is connected through feed pipe 3 with pump 18 and evacuated (pressure in autoclave 1 = 133 Pa). Valves 20, 14, 10 and 11 are opened and the reactor 1 is filled with carbon monoxide, until the pressure of carbon monoxide in the reactor is 0.42 MPa. After valve 11 is closed, the reactor 1 is heated to 348° K with constant stirring. After a reaction time of 60 minutes, autoclave 1 is heated to 473° K and reactor 6 to 573° K.

With valve 10 closed and valves 11 and 12 open, the carbon monoxide in reactor 1 flows into and through the decomposition reactor 6, which is charged with magnesium powder with an average particle size of 54 μm. The carbon monoxide, which leaves reactor 6 and from which traces of tetracarbonyl nickel have been removed, is passed over pipeline 9 to burner 13, in which it is mixed with propane gas and burned.

After the pressure has dropped to atmospheric pressure, valve 12 is closed, the decomposition reactor 6 is allowed to cool down and the burner 13 is extinguished.

Reactor 1 is now evacuated once more over pipeline 13 by means of the pump 18. With valves 21, 15, 14, 10 and 11 open, hydrogen is admitted to reactor 1 up to a pressure of 0.5 MPa. After valve 11 is closed, the reactor 1 is heated to a temperature of 623° K. The variation in temperature and pressure is recorded with a multichannel recorder. When the hydrogenation commences (reaction temperature $\geq 573°$ K), the pressure of hydrogen in the reactor 1 is raised to and maintained at 0.85 MPa. The reaction is concluded after about 7 hours. When the autoclave has cooled down, it is evacuated once more and flooded over pipeline 3 with argon. The magnesium hydride obtained is discharged over sump outlet valve 5 as a free flowing powder into a baked out vessel that is filled with argon.

Yield: 528.7 g (96% of the theoretical yield)

The hydride content of a sample is determined volumetrically by decomposition with $H_2CrO_4$ according to a method published in Zh. Neorgh. Khim. 6, 1961 and found to be 7.0%.

For comparison, a combustion analysis was carried out, which also revealed a hydride content of 7.0%.

Atomic absorption analysis showed that the nickel content was 1.8% (1.84 = the calculated content).

What is claimed is:

1. Method for the preparation of an active magnesium hydride-magnesium-hydrogen storage system capable of reversibly absorbing hydrogen, wherein magnesium of fine particle size is doped with nickel, with the nickel being deposited on the surface of the magnesium by the decomposition of tetracarbonyl nickel, said method comprising:

a) charging the reaction space of a pressure reactor with magnesium of fine particle size and with an amount of nickel sufficient to cause doping of the magnesium;

b) introducing carbon monoxide into said reaction space containing said magnesium and said nickel and heating the mixture in the space under intense stirring to a temperature of between about 70° to 90° C. and maintaining the mixture at said temperature for a period of between about 15 to 60 minutes, said carbon monoxide being introduced in an amount at least sufficient to quantitatively convert the nickel into tetracarbonyl nickel, whereby tetracarbonyl nickel is formed;

c) heating the mixture in said reaction space to a temperature of $\geq 180°$ C. to decompose said tetracarbonyl nickel;

d) withdrawing carbon monoxide from the reaction space; and e) hydrogenating the nickel doped magnesium thus obtained at a temperature of about $\geq 300°$ C. and at increased pressure.

2. The method of claim 1, wherein the magnesium has a particle size of 20 to 100 μm.

3. The method of claim 1 or 2, wherein, in step b), prior to the heating of the mixture, the carbon monoxide pressure is adjusted to a value of 0.3 to 0.6 MPa.

4. The method of claim 1 or 2, wherein the carbon monoxide withdrawn from the reaction space in step d) is passed through a decomposition zone containing finely divided magnesium and heated to a temperature of $\geq 300°$ C.

5. The method of claim 4, wherein the carbon monoxide, after passing through said decomposition zone, is burned.

6. The method of claim 5, wherein prior to said burning, the carbon monoxide is admixed with propane or butane.

7. The method of claim 1 or 2, wherein the hydrogenation of step e) of the nickel doped magnesium is effected at temperatures of $>320°$ C. and a hydrogen pressure of between about 0.5 to 5 MPa.

* * * * *